United States Patent [19]

Schmitt et al.

[11] 4,435,163

[45] Mar. 6, 1984

[54] DENTAL TECHNIQUE TRAINING DEVICE

[76] Inventors: Oscar A. Schmitt, 4218 State St., Erie, Pa. 16509; Robert Nedreski, 5073 Wiltsie Rd., Pa. 16510; Eskil Karlson, 4634 State St., Erie, Pa. 16509

[21] Appl. No.: 350,207

[22] Filed: Feb. 19, 1982

[51] Int. Cl.³ ............................................ G09B 23/28
[52] U.S. Cl. .................................... 434/263; 434/266
[58] Field of Search ............... 433/167; 434/185, 262, 434/263, 264, 270; 132/90, 91

[56] References Cited

U.S. PATENT DOCUMENTS

| | | | |
|---|---|---|---|
| 2,095,511 | 10/1937 | Oberto | 434/264 |
| 3,662,374 | 5/1972 | Harrison et al. | 340/725 X |
| 4,078,311 | 3/1978 | Hoisington | 434/263 X |
| 4,096,645 | 6/1978 | Mandl | 434/264 X |
| 4,102,047 | 7/1978 | Walker | 434/263 X |
| 4,253,212 | 3/1981 | Fujita | 434/263 X |
| 4,287,895 | 9/1981 | Hori | 434/185 X |
| 4,360,345 | 11/1982 | Hon | 434/307 X |

OTHER PUBLICATIONS

Dental Survey, *The Journal of Dental Practice*, "Dental Robot so Lifelike it Cries 'Ouch'", p. 37, Jan. 1970.

*Primary Examiner*—Vance Y. Hum
*Assistant Examiner*—Mary Ann Stole
*Attorney, Agent, or Firm*—Charles L. Lovercheck; Wayne L. Lovercheck; Dale R. Lovercheck

[57] ABSTRACT

An educational device for teaching dental hygiene is disclosed. The device consists of a model of a human head having a mouth with teeth, moveable jaw and sensors imbedded in the teeth. A microprocessor is provided and the sensors are connected to the microprocessor. A probe and a toothbrush are connected to the microprocessor and may be held in the hand of an operator adjacent the teeth to simulate brushing, flossing, and other dental activities. Light emitting diodes of different colors are imbedded in the teeth and connected to the microprocessor to indicate conditions of the teeth. A speaker and a memory device are connected to the microprocessor to audibly discuss the procedures carried out with the information fed to the microprocessor from the teeth, and a command unit is provided to actuate the jaw to open and close the mouth.

23 Claims, 10 Drawing Figures

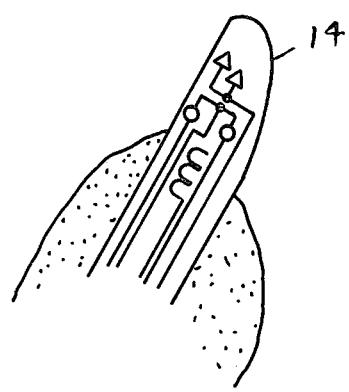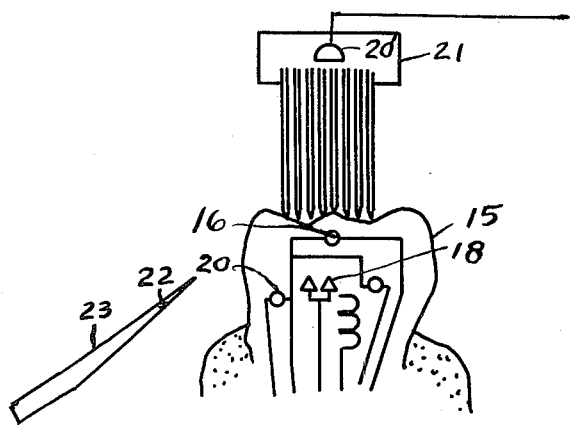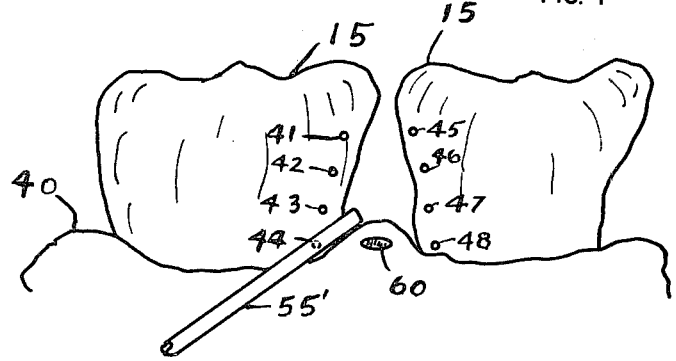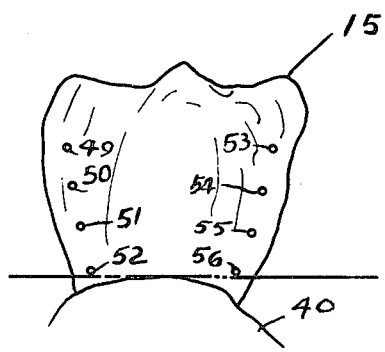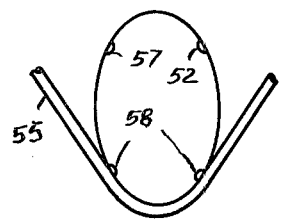
FIG. 3
FIG. 4
FIG. 5
FIG. 6
FIG. 7

DENTAL TECHNIQUE TRAINING DEVICE

BRIEF DESCRIPTION OF THE DRAWINGS

The invention consists of a doll or manikin, preferably life size, representing the head or the shoulders and head for a more complete representation, for example, of the body of a young child. The manikin has a complete set of teeth of realistic appearance and articulated lower jaw. The teeth enclose electrical and/or electronic devices and circuitry serving several purposes which include providing a display of simulated stains on the teeth representing contamination from food or other sources; providing means for detecting the amount and quality of brushing of the teeth with a specially constructed toothbrush provided which contains a sensor connected to a microprocessor through an extension cord. A specially constructed probe containing an electronic component or sensor is connected to the microprocessor by an extension cord, and the probe is adapted to make contact with individual teeth. A display of teeth, or areas of teeth not properly or sufficiently brushed, is provided when a suitable command signal is given.

The articulated lower jaw has means connected to open it to permit examining the teeth; and any or all the teeth may be touched by the toothbrush or by the probe.

Figure 1:
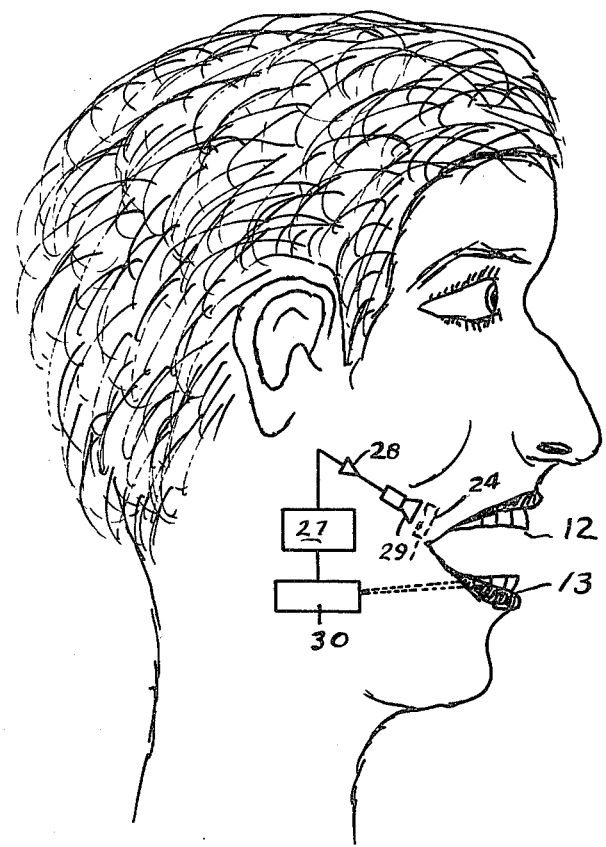

The microprocessor and other electrical and electronic circuitry may be housed inside the manikin's head or body. This circuitry includes actuating means for the jaw; actuating means for the simulated display of tooth stains; actuating means for the areas of the teeth not properly or sufficiently brushed; the microprocessor may reproduce in audible form, a human voice, a pre-recorded message relating to (1) registering and recording the contact of brush, probe, and floss with teeth, (2) selecting and reproducing appropriate pre-recorded messages on the basis of the data recorded; (3) responding to external commands to select and actuate the various displays and/or pre-recorded messages.

The modes of operation of the device disclosed are; (1) a person using the manikin could touch one of the teeth with a probe, causing a device within the tooth to signal which tooth was touched and the associated equipment may actuate a recording for playback, as, for example: "This tooth is called an incisor. It is used to cut or chop food". (2) A child may issue a command by pushing a button, speaking an appropriate phrase, or a similar message and the manikins' teeth will display simulated stains, indicating supposed contamination. The child may then brush the manikin's teeth with the toothbrush, and—with sufficient and proper brushing—the simulated stains will gradually fade, indicating to the child that he/she is brushing the teeth correctly. (3) The child may, after brushing the teeth, issue an appropriate command from a transmitter or the like and the teeth will display, in a distinctive manner, areas which have received insufficient, or marginal, brushing. (4) The manikin is also designed and constructed so that within a short time after the commencement of brushing, an appropriate message will be selected and reproduced, stating either that the person was brushing properly, or that one or more teeth were being inadequately brushed. The person could also floss the teeth with a special simulated dental floss. And several oral messages can be delivered concerning the quality of the flossing. (5) On an appropriate command, the manikin will select and reproduce one of several different lectures on good dental hygiene. The pre-recorded messages are recorded and reproduced by any one of several different means, including:

(A) Speech Synthesis may be provided by a microprocessor, from digital recordings in integrated circuit memories. This method offers fast access to, and retrieval of, the various messages.

(B) Reproduction from a magnetic tape, such as is used in cassette recorders. The various messages may be indexed by means of inaudible signals recorded on the tape at the beginning of each message, and located by high-speed scanning of the tape under control of a microprocessor. The method has the disadvantages of moving parts and mechanical noise and wear.

REFERENCE TO PRIOR ART

The following prior art patents are known to Applicant: U.S. Pat. Nos. 3,912,636; 3,910,842; 3,719,017; 3,904,096; 4,019,522.

These patents in general are directed to devices permitting practice of dental procedures by dental students or dental technicians, rather than being directed, as is the present invention, to the education of lay persons in proper dental hygiene, and permitting the practice thereof—as monitored and commented upon by the invention in a location other than in the person's own mouth.

In particular:

U.S. Pat. No. 3,780,439 (References: U.S. Pat. No. 703,720; U.S. Pat. No. 3,520,060) covers only a simulated dentition, to be inserted in a human mouth, and intended for practice by student dentists and dental technicians.

U.S. Pat. No. 3,931,679 and references: U.S. Pat. Nos. 2,103,058; 2,203,891; 2,574,838; 2,576,569; 3,520,060 according to the patent is a device intended solely to enable dental students to practice on various tooth conditions, and contains none of the features described in the present invention for educating the patient or other non-dental student in proper dental hygiene or permitting practice of normal, personal dental care by such person.

U.S. Pat. No. 4,019,522 and references: U.S. Pat. Nos. 739,980; 760,943; 1,342,156; 2,730,439; 3,931,679 while pertaining to dental instruction of a lay person, covers only a dental instruction kit, wherein stains are applied manually to the doll's teeth and in which instructions are provided to the user in the form of an instruction booklet, whereas in the present invention the stains are simulated by self-contained means within the manikin, without effort on the part of the user other than pressing a button or giving other simple command. Likewise, instructions are given verbally by the manikin, obviating the need for reading on the part of the user, who may be a young child incapable of reading such instructions. The referenced invention also appears from the abstract to be limited to younger children and to giving practice only in brushing the teeth.

OBJECTS OF THE INVENTION

It is the object of the invention to provide an educational device to teach young children proper dental hygiene.

Another object of the invention is to provide an educational device to give young children actual, monitored practice in the proper care of their teeth.

Another object of the invention is to provide an educational device in a form which will be attractive and interesting to young children, thereby assuring good attention to the instructions.

With the above and other objects in view, the present invention consists of the combination and arrangement of parts hereinafter more fully described, illustrated in the accompanying drawing and more particularly pointed out in the appended claims, it being understood that changes may be made in the form, size, proportion and minor details of construction without departing from the spirit or sacrificing any of the advantages of the invention.

BRIEF DESCRIPTION OF DRAWINGS

FIG. 1 is a view of a simulated human head with associated apparatus according to the invention.

Figure 2:
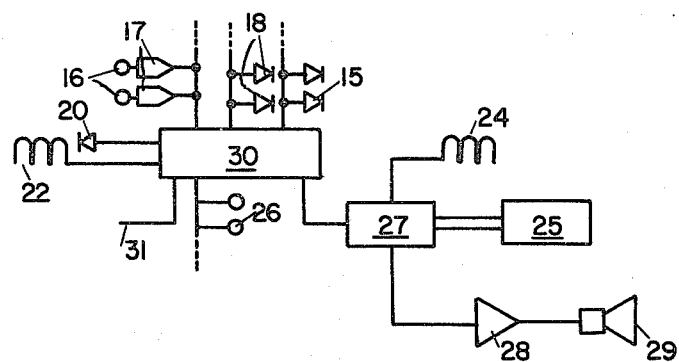

FIG. 2 is a block diagram of the electrical components of the invention.

FIG. 3 is an enlarged diagram of an incisor having the parts according to the invention shown along with it.

FIG. 4 is a view of a premolar with electronic components according to the invention.

FIG. 5 is a view of two adjacent teeth showing the floss and electronic components.

FIG. 6 is a view of another tooth with electronic components imbedded in it according to the invention.

FIG. 7 is a cross sectional view taken on line 7—7 of FIG. 6.

Figure 8:
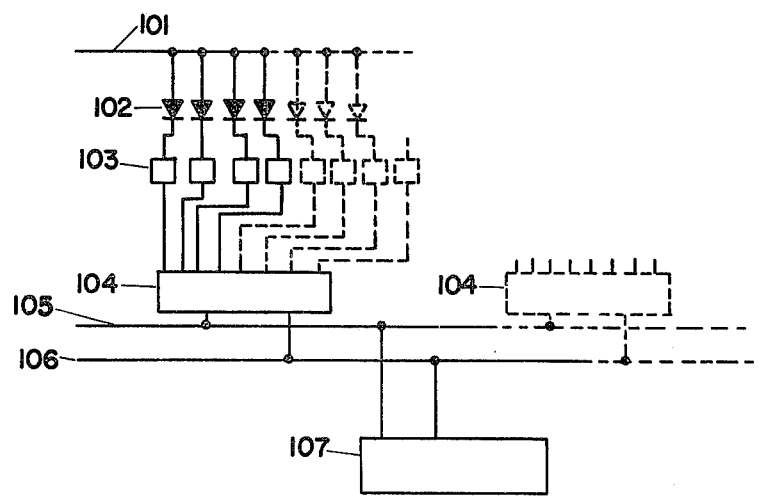

FIG. 8 is an example of a circuit for coupling brush strokes sensors in the teeth to the microprocessor.

Figure 9:
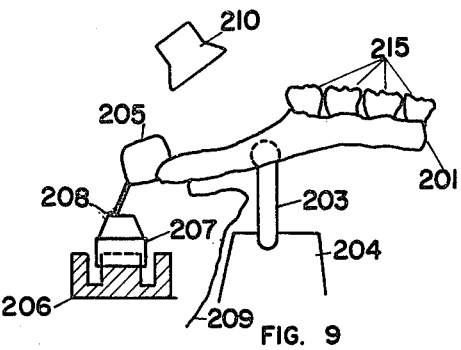

FIG. 9 shows a jawbone actuating device for the simulated head.

Figure 10:
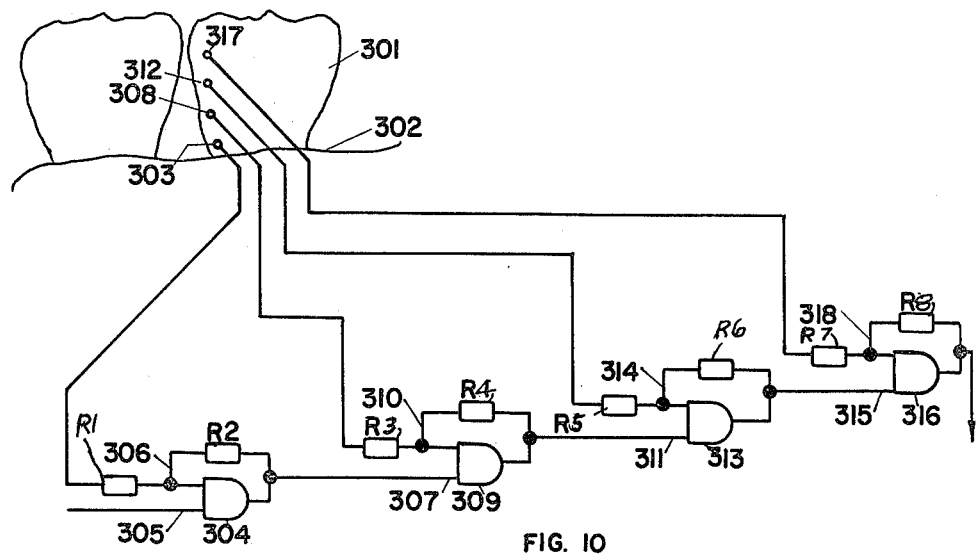

FIG. 10 is a schematic diagram of a circuit to determine proper flossing.

DETAILED DESCRIPTION OF THE DRAWINGS

Now with more particular reference to drawing, the manikin head shown in FIG. 1 can have the electrical components 15 through 30 according to the invention imbedded in the head 11. The head has a mouth 12 having a lower jaw 13 swingably connected to the head. The teeth include incisors 14 and premolars 15 supported in the gum tissue 40.

The electronic circuit according to the invention in the embodiment shown has a microprocessor 30, with counter 17 connected to the brush stroke sensors 16 that are imbedded in the teeth. The microprocessor can be imbedded in the head, neck, or body of the manikin. The sound mechanism can likewise be imbedded in the body. Diodes 16 which may be of a light emitting variety are imbedded in the teeth as are diodes 18 and diodes 26. Diodes 16 and 18 may be the LED type diodes of various colors to indicate such things as simulated stains, improper brushing and the like. Likewise, diodes 41, 42, 43, 44, 45, 46, 47, 48, 49, 50, 51, 52, 53, 54, 55, 56, 57, and 58 may be imbedded in the teeth 15 and a simulated floss member 55' may actuate sensor 60 imbedded in the gums 40 as shown and connected to the solid state counters 17 for counting brush strokes. Light emitting diodes 18 are imbedded in the teeth 14 and 15 to simulate stains and light emitting diodes 18 are imbedded in the teeth 14 and 15 to indicate that the teeth having the diode therein are not properly brushed.

An infra-red emitting diode 20' is supported in a special toothbrush 21 and a signal emitter 22 in special probe 23 cooperates with the other components in the teeth.

The toothbrush diode 20' is connected to the microprocessor 30 by a suitable conductor cord as is the electronic sensing device 22 in the probe 23. The probe 23 is connected to the microprocessor 30 through a suitable flexible cord.

The infra-red emitting diode 20 in the toothbrush and the signal emitting diode 22 in special probe 23 cooperates with the other components in the microprocessor to give the proper signal in the tooth.

A lower jaw actuating device 24 may be a solenoid and armature which opens and closes the lower jaw and is controlled by the microprocessor and a suitable command unit 31 in order to have the jaw moved to simulate speech.

An integrated circuit memory 25 contains speech data which may be broadcast through speaker 29.

A speaker unit 29 is supported in the manikin's head and it reproduces the speech of a person from a prerecorded record or magnetic tape.

Electrodes or diodes imbedded in surfaces of said teeth, suitably located and disposed, will detect the action of a simulated dental floss to determine if flossing were properly performed. The simuluated floss may consist of an electrically conductive plastic or other electrically conductive material, having the appearance of dental floss. If the primary sensing devices connected to said electrodes are made of a type known to those skilled in the art as "CMOS", or similar, the operating voltages and currents could be so low as to present no electrical shock hazard from the exposed electrodes.

Pressure-sensitive elements 60 imbedded in said gums in spaces between adjacent teeth detect excessive pressure or improper initial insertion of said simulated floss between adjacent teeth, of the type commonly known as "snapping"—or the sharp, abrupt impact of said floss against said gum—such as would cause pain or damage to the gum in a human mouth. If this condition occurs, said pressure-sensitive element sends a signal to aforementioned microprocessor, using it to retrieve and reproduce appropriate comments such as: "Ouch! You shouldn't snap the floss against my gums".

Proper sequence of signals from said electrodes for all teeth is recognized by microprocessor as evidence of proper completion of flossing, at which point said microprocessor retrieves and reproduces a congratulatory message.

FIGS. 8, 9 and 10 show more specific examples of the invention. FIG. 8 illustrates an example of a circuit for coupling between the brush-stroke sensors in the teeth of the manikin and the microprocessor.

Power is supplied on bus 10 to brush-stroke sensors 102, which might be photodiodes. On each brush stroke, the pulse of light received by sensors 102 causes an electrical pulse to be applied to counter 103. The counters may be, for example, CMOS integrated circuits of the type known in the art as a 4024, which with suitable auxiliary circuits can be set to give an output after receiving any number of pulses up to 128.

Each brush-stroke sensor is provided with its own counter.

The outputs of the counters are connected successively and in turn to the microprocessor through devices known as multiplexers. A suitable device for this purpose is the CMOS integrated circuit known as a 4512 commonly called an 8-channel data selector. The characteristics of this device are such that it can successively connect any of the eight inputs to the output in sequence and in any desired order, but also, a number of 4512's can be connected to a common output, in which case all but a selected one of the 4512's may be disabled, so that each, in turn, may send each of its 8 inputs to the microprocessor 107 without being affected by the other 4512's.

105 represents a control bus, by means of which the microprocessor determines which multiplexer is turned on, or can transmit information and 106 is a signal bus over which the multiplexers send data to the microprocessor.

Furthermore, multiplexers of this type could be used to send the data from the other sensors, such as the probe sensors and the floss sensors to the microprocessor.

Because a microprocessor receives much of its data in sequence, at definite time periods, by coupling the multiplexers to the same timing source or "clock", used by the microprocessor, the time of arrival of each signal would indicate its source, or point of origin. In this manner, the microprocessor would be able to determine, for example, when each tooth had received adequate brushing.

Alternatively, since most microprocessors are adapted to receive data in the forms known as "4-bit", "8-bit", or "16-bit", —that is, a combination of 4, 8, or 16 simultaneous inputs, the microprocessor could accept inputs from 4, 8, or 16 of the multiplexers at the same time, thus reducing the amount of switching of multiplexers required.

Moreover, by determining the elapsed time from beginning of brushing and the completion of brushing of a given tooth, inadequate brushing of teeth could be detected.

In FIG. 9, 201 represents the simulated lower jawbone, supporting teeth 215. The simulated jawbone should be made of a lightweight, reasonably rigid substance, such as one of the rigid, foamed plastics. The jawbone 201 is supported on a flexible member 203, the other end of which is attached to the framework 204 of the manikin's head. 205 represents a counterweight so proportioned as to balance the mass of the moving parts about the hinge point provided by flexible member 203.

The motion of the jawbone required for simulated speech is provided by a mechanism similar to the device known in the radio and electronics arts as a dynamic speaker, with the so-called cone omitted. 206 is a magnet with an annular air gap, in which is suspended a coil 207 of the type known as a voice coil. Coil 207 is coupled by a low-mass link 208 to the jawbone assembly, possibly, but not necessarily, in the region of the counterweight 205.

209 is a flexible, multiconductor cable consisting of electrical conductors to connect the electronic devices in the teeth and gums to the remainder of the circuitry in the manikin. 210 represents a miniature speaker mounted in the oral cavity of the manikin to reproduce the speech sounds.

The actuating system 206 and 207 for the lower jaw might be driven from the same signal source as the speaker 210, by means of a separate amplifier, said amplifier incorporating a circuit of the type known as a low-pass filter, so that the jaw is actuated only by the most slowly changing components of the speech signal.

FIG. 10 shows a circuit which could be used to detect proper flossing of the left-hand surface of the tooth 201, with only the final output going to the microprocessor, thereby simplifying the programming thereof. In this illustration, only the output electrodes, 303, 308, 312, and 317 are shown. The corresponding electrodes, which are electrically connected by means of the simulated floss to those shown are on the reverse face of tooth 301 and are invisible in FIG. 10.

This circuit makes use of devices known in the art as 2-input AND gates, which have the property that when an electrical signal is applied to both inputs, an electrical signal is provided at the output. A CMOS integrated circuit known as a 4081 contains four of these devices, and thus would provide sensing of proper flossing for one tooth face in the circuit shown.

Input 205 of AND gate 304 is connected to the power supply contained within the manikin. Thus, when the simulated floss makes contact with electrode 303, an electrical signal is applied through resistor R1 to input 306 of AND gate 304, thus providing an output from 304. This output is fed back through resistor R2 to input 306, thus maintaining the output of 304, even after the simulated floss no longer makes contact with electrode 303.

The output of 304 is also applied to input 307 of AND gate 309, so that when the floss makes contact with electrode 308 and a signal is applied through resistor R3 to input 310, AND gate 309 produces an output. Said output is again fed back through resistor R4 to input 310 to maintain the output of 309 when the signal from electrode 308 is removed.

The same process occurs with input 311 of AND gates 313, electrode 312, resistor R5, input 314 and resistor R6, and is repeated for input 315, AND gate 316, electrode 317, resistor R7 and resistor R8, with the end result that AND gate 316 provides a signal to the microprocessor only if electrodes 303, 308, 312, and 317 are contacted by the simulated floss in sequence.

As with the brush-stroke sensors and counters, the outputs from the floss-sensing circuits for the individual tooth-free circuits could be switched in succession to the microprocessor by multiplexing devices.

The foregoing specification sets forth the invention in its preferred, practical forms but the structure shown is capable of modification within a range of equivalents without departing from the invention which is to be understood is broadly novel as in commensurate with the appended claims.

The embodiments of the invention in which an exclusive property or privilege is claimed are defined as follows:

1. A dental teaching device comprising,
   a manikin head having a mouth with moveable jaw and teeth,
   each said tooth having at least one electrical sensing element imbedded therein,
   a microprocessor,
   at least some of said electrical sensing elements being disposed in said teeth, being connected to said microprocessor, and actuating counting devices contained in the manikin,
   said electrical elements include a special sensing element connected to said microprocessor by means of an elongated electrical conducting means connected to a said microprocessor,
   said special sensing element being adapted to be brought into close proximity to a said tooth and adapted to sense the electrical elements in said teeth whereby the effect on said teeth is indicated.

2. The device recited in claim 1 wherein said electrical sensing element includes means to simulate stains on said teeth.

3. The device recited in claim 1 or 2 wherein said condition sensed includes imperfect brushing.

4. The device recited in claim 3 wherein electronic means is provided in the said head for providing oral comments on the effectiveness of brushing.

5. The device recited in claim 4 wherein said semiconductor processing devices are adapted to emit messages to a memory means.

6. The device recited in claim 1, wherein said device includes a counter for counting the brush strokes during tooth brushing.

7. The device recited in claim 6 wherein said device includes memory means for storing lectures and means for delivery of said lectures audibly from said manikin.

8. The device recited in claim 7 wherein said memory means is connected to some of said electrical elements whereby said lecture is delivered when a said sensing element is actuated by a said special sensing element.

9. The device recited in claim 8 wherein said special sensing element is a simulated toothbrush.

10. The device recited in claim 8 wherein said special sensing element is a probe.

11. The device recited in claim 8 wherein said device includes an electrical conductive material for simulating flossing.

12. The device recited in claim 1 wherein said conducting means comprises an elongated electrical cord.

13. The device recited in claim 1 wherein said special sensing element comprises a simulated toothbrush.

14. The device recited in claim 13 wherein said electrical sensing elements imbedded in said teeth actuate counting devices for counting brush strokes when invaded by a toothbrush containing an electronic emitting device.

15. The device recited in claim 14 wherein semiconductor processing devices are provided connected to actuate a speech simulating device.

16. The device recited in claim 1 wherein said effect on said teeth is indicating means to indicate stains on said teeth.

17. The device recited in claim 1 wherein the condition of said teeth is indicated by the number of strokes of brushing.

18. The device recited in claim 1 wherein said teeth are made of white translucent material simulating natural teeth in appearance.

19. The device recited in claim 18 wherein sad teeth are partially imbedded in plastic material simulating natural gums.

20. The device recited in claim 19 wherein said teeth contain a material simulating stains on teeth.

21. The device recited in claim 19 wherein said teeth contain material capable of sensing the movement of a toothbrush over them.

22. The device recited in claim 21 wherein a special brush is provided, said special brush containing a device for emitting an electronic signal capable of detection by said electrical elements contained in said teeth.

23. The device recited in claim 1 including means for producing speech adapted to send out speeches to an amplifier.

* * * * *